United States Patent
Ott et al.

(10) Patent No.: US 11,522,323 B2
(45) Date of Patent: Dec. 6, 2022

(54) HIGH-VOLTAGE PLUG CONNECTION PART FOR A HIGH-VOLTAGE PLUG CONNECTOR OF A MOTOR VEHICLE, HIGH-VOLTAGE ELECTRICAL SYSTEM, AND MOTOR VEHICLE

(71) Applicant: Bayerische Motoren Werke Aktiengesellschaft, Munich (DE)

(72) Inventors: Johannes Ott, Munich (DE); Josef Poemmerl, Furth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 226 days.

(21) Appl. No.: 16/836,043

(22) Filed: Mar. 31, 2020

(65) Prior Publication Data
US 2020/0227869 A1    Jul. 16, 2020

Related U.S. Application Data

(63) Continuation of application No. PCT/EP2018/081353, filed on Nov. 15, 2018.

(30) Foreign Application Priority Data

Dec. 13, 2017   (DE) ..................... 10 2017 222 541.6

(51) Int. Cl.
*H01R 13/66* (2006.01)
*B60L 50/50* (2019.01)
(Continued)

(52) U.S. Cl.
CPC .......... *H01R 13/6683* (2013.01); *B60L 50/50* (2019.02); *G01K 7/16* (2013.01);
(Continued)

(58) Field of Classification Search
CPC ................ H01R 13/6683; H01R 13/53; H01R 2201/26; B60L 50/50; G01K 7/06;
(Continued)

(56) References Cited

U.S. PATENT DOCUMENTS 10,170,871 B1 * 1/2019 Troeger ............ G01K 11/3206
10,256,579 B2 * 4/2019 Fuehrer .................... H01R 4/20
(Continued)

FOREIGN PATENT DOCUMENTS

CN    104701682 A    6/2015
CN    105938958 A    9/2016
(Continued)

OTHER PUBLICATIONS

International Search Report (PCT/ISA/210) issued in PCT Application No. PCT/EP2018/081353 dated Feb. 22, 2019 with English translation (six (6) pages).
(Continued)

*Primary Examiner* — Travis S Chambers
(74) *Attorney, Agent, or Firm* — Crowell & Moring LLP

(57) ABSTRACT

A high-voltage plug connection part for a high-voltage plug connector of a high-voltage electrical system of a motor vehicle, the high-voltage electrical system, and the motor vehicle are disclosed herein. The high-voltage plug connector can be coupled to at least one high-voltage line. The high-voltage plug connection part has at least one integrated temperature sensor which is designed to detect a sensor signal that characterizes the temperature of the at least one high-voltage line and provide the detected sensor signal to an analysis device in order to monitor the temperature of the at least one high-voltage line.

17 Claims, 2 Drawing Sheets

(51) Int. Cl.
  *G01K 7/16* (2006.01)
  *G01K 13/00* (2021.01)
  *H01R 13/53* (2006.01)
(52) U.S. Cl.
  CPC ............ *G01K 13/00* (2013.01); *H01R 13/53* (2013.01); *G01K 2205/00* (2013.01); *H01R 2201/26* (2013.01)
(58) Field of Classification Search
  CPC .... G01K 13/00; G01K 2205/00; Y02T 10/70; Y10S 439/913
  See application file for complete search history.

(56) References Cited

U.S. PATENT DOCUMENTS

| | | | |
|---|---|---|---|
| 10,530,101 | B2 | 1/2020 | Rose et al. |
| 2012/0212179 | A1 | 8/2012 | Nathan et al. |
| 2016/0039297 | A1* | 2/2016 | Kretschmer ........... G01K 13/00 439/620.21 |
| 2017/0279225 | A1 | 9/2017 | Wimmer et al. |
| 2018/0001774 | A1* | 1/2018 | Murata ................ B60L 58/27 |
| 2018/0201153 | A1* | 7/2018 | Sturza .................. H01R 13/53 |
| 2018/0354383 | A1* | 12/2018 | Namou ............... B60L 53/126 |
| 2019/0162603 | A1* | 5/2019 | Lyon .................. H01R 13/6683 |
| 2020/0185847 | A1* | 6/2020 | Feldner ................ H01R 13/24 |
| 2020/0381874 | A1* | 12/2020 | Rose ...................... G01K 1/16 |
| 2021/0242636 | A1* | 8/2021 | Kosmalski ............ H01R 13/44 |

FOREIGN PATENT DOCUMENTS

| | | | | |
|---|---|---|---|---|
| CN | 206163747 | U | 5/2017 | |
| CN | 206195010 | U | 5/2017 | |
| DE | 10 2010 045 131 | A1 | 3/2012 | |
| DE | 10 2012 200 523 | A1 | 8/2012 | |
| DE | 20 2015106 844 | U1 | 4/2016 | |
| DE | 10 2016 105 504 | A1 | 9/2017 | |
| WO | WO-2016075267 | A1 * | 5/2016 | ............... B60L 3/04 |
| WO | WO 2016/169940 | A1 | 10/2016 | |
| WO | WO-2016169940 | A1 * | 10/2016 | ............. B60L 53/16 |

OTHER PUBLICATIONS

German-language Written Opinion (PCT/ISA/237) issued in PCT Application No. PCT/EP2018/081353 dated Feb. 22, 2019 (six (6) pages).
German-language Search Report issued in German Application No. 10 2017 222 541.6 dated Sep. 17, 2018 with partial English translation (12 pages).
Chinese-language Office Action issued in Chinese Application No. 201880061856.6 dated Oct. 10, 2020 (eight (8) pages).
English translation of Chinese Office Action issued in Chinese Application No. 201880061856.6 dated Jan. 29, 2022 (six (6) pages).

* cited by examiner

HIGH-VOLTAGE PLUG CONNECTION PART FOR A HIGH-VOLTAGE PLUG CONNECTOR OF A MOTOR VEHICLE, HIGH-VOLTAGE ELECTRICAL SYSTEM, AND MOTOR VEHICLE

CROSS REFERENCE TO RELATED APPLICATIONS

This application is a continuation of PCT International Application No. PCT/EP2018/081353, filed Nov. 15, 2018, which claims priority under 35 U.S.C. § 119 from German Patent Application No. 10 2017 222 541.6, filed Dec. 13, 2017, the entire disclosures of which are herein expressly incorporated by reference.

BACKGROUND AND SUMMARY OF THE INVENTION

The invention relates to a high-voltage plug connection part for a high-voltage plug connector, which can be coupled to at least one high-voltage line, of a high-voltage electrical system of a motor vehicle. The invention additionally relates to a high-voltage electrical system and to a motor vehicle.

In this case, interest focuses on high-voltage lines for motor vehicles, which can transmit an electrical current between high-voltage components or high-voltage aggregates, respectively, of the motor vehicle. High-voltage components of this type can be, for example, a high-voltage battery, in particular a traction battery, and an electric drive motor, in particular a traction e-motor. The current flowing through the high-voltage line results in a heating of the high-voltage line. The heating is thereby a function of a height of the current, a duration of the current flow, and a resistance of the high-voltage line, which, in turn, is a function of a specific resistance of a material of the high-voltage line, a line length, and a line cross section.

Due to an unacceptable heating, thus due to a heating of larger than a predetermined threshold value, it may happen that an insulation of the high-voltage line is damaged, whereby fires may be caused and persons may thus be endangered. To prevent this and to protect the high-voltage lines against an unwanted high heating, safety margins, for example, can be provided for securing the line protection. The line cross section, for example, can be larger than a line cross section, which is necessary for the power to be transmitted, and/or a power, which is transmitted via the high-voltage line, can be reduced. This line cross section, which is selected to be unnecessarily large due to "worst-case" assumptions with regard to an ambient temperature of the high-voltage line, of an aging behavior of the high-voltage line, and other tolerances, leads to a high weight and to high material costs of the high-voltage line. It may also happen that a power, which is transmitted by the high-voltage line, is reduced unnecessarily, which results in power limitations as compared to an actually possible power limit of the high-voltage line.

It is an object of the present invention to be able to form a high-voltage line of a high-voltage electrical system of a motor vehicle in a particularly space-saving manner and so as to be gentle on the material, and to simultaneously be able to use it particularly reliably for the power transmission between high-voltage components of the high-voltage electrical system.

This object is achieved according to the invention by a high-voltage plug connection part, a high-voltage electrical system, and a motor vehicle comprising the features according to the respective independent patent claims. Advantageous embodiments of the invention are the subject matter of the dependent patent claims, of the description, and of the figures.

A high-voltage plug connection part according to the invention for a high-voltage plug connector, which can be coupled to at least one high-voltage line, of a high-voltage electrical system of a motor vehicle has at least one integrated temperature sensor. The at least one temperature sensor is designed to detect a sensor signal that characterizes a temperature of the at least one high-voltage line, and to provide the detected sensor signal to an analysis device in order to monitor the temperature of the at least one high-voltage line.

The high-voltage plug connector has in particular two high-voltage plug connection parts, wherein a first high-voltage plug connection part can be coupled to a first high-voltage component of the high-voltage electrical system, and a second high-voltage plug connection part can be coupled to a second high-voltage component of the high-voltage electrical system. At least one of the high-voltage plug connection parts is thereby electrically coupled via a high-voltage line to the assigned high-voltage component. The other high-voltage plug connection part can be, for example, a high-voltage plug connection part, which is installed or integrated, respectively, in the high-voltage component. The high-voltage components can be, for example, a high-voltage battery and an electric drive motor comprising integrated power electronics. The high-voltage plug connection parts can thereby be positively connected by plugging them together. For example an electrical current, which is provided by the high-voltage battery and which is transported via the high-voltage line to the high-voltage plug connector, can be transmitted via the high-voltage plug connection to the electric drive motor.

The high-voltage plug connection realized by the high-voltage plug connector thereby represents a thermal bottleneck, at which a heating in the high-voltage transmission section between the high-voltage components can be particularly serious. This is so, because hotspots, which may lead to an overheating of the high-voltage line and thus to a failure of the high-voltage electrical system, are created in the region of the high-voltage plug connector. At least one of the high-voltage plug connection parts thus has the at least one integrated temperature sensor, by which the temperature of the high-voltage line can be monitored. The critical regions in the high-voltage connection between the high-voltage components, which are at risk of overheating, can be monitored particularly well and reliably by the integration of the temperature sensor in one of the high-voltage plug connection parts, thus by attaching the temperature sensor close to the hotspots. The at least one temperature sensor thereby detects a temperature-dependent signal and provides the latter to an analysis device of the high-voltage electrical system.

The analysis device can be, for example, a plug connection-external analysis device and can be integrated in one of the high-voltage components. The analysis device can be integrated, for example, in an integrated inverter of the electric drive motor. The temperature sensor can transmit the signal, for example, in a wired manner and/or wirelessly to the analysis device. The analysis device can monitor the temperature of the high-voltage line via the sensor signal and can determine, for example, whether the temperature exceeds a predetermined, critical temperature threshold value. If the temperature threshold value is exceeded, the analysis device can generate a signal, for example, by which a power transported via the high-voltage line is reduced. An overheating of the high-voltage line can thus be counteracted.

By detecting the temperature at the critical points in the high-voltage connection, safety margins can be forgone in an advantageous manner in the performance protection. The high-voltage line can thus be operated up to its physical performance limit, in that a line cross section of the high-voltage line is utilized completely. In other words, a power, which is actually possible in the case of the line cross section, is transmitted via the high-voltage line. If a power, which had previously been transmitted via the high-voltage line, is sufficient, the line cross section can also be reduced, whereby material costs and weight of the high-voltage line can be reduced in an advantageous manner.

The at least one temperature sensor is preferably formed as an NTC resistor. An NTC resistor or thermistor, respectively, has a temperature-dependent resistance. A resistance signal of the thermistor can thus be detected as the temperature-dependent sensor signal and can be provided to the analysis device. The analysis device can determine the current temperature of the high-voltage line from the resistance signal. NTC resistors are particularly cost-efficient and can additionally be produced in particularly compact design and can be integrated in the high-voltage plug connection part close to the potential hotspots.

According to an embodiment of the invention, the high-voltage plug connection part is formed as a cable end plug connection part, in particular as a high-voltage connector, for connecting to the high-voltage line of a cable harness of the high-voltage electrical system of the motor vehicle. According to another embodiment of the invention, the high-voltage plug connection part is formed as a built-in plug connection part, in particular as a high-voltage socket, for installing in a high-voltage component, in particular in an electric drive motor, of the high-voltage electrical system of the motor vehicle.

A first high-voltage plug connection part can thus be electrically coupled to the high-voltage line, which, in turn, can be coupled to a high-voltage component, for example a high-voltage battery. For this purpose, the cable end plug connection part is formed, for example, as a high-voltage connector or as a high-voltage coupling. The cable end plug connection part can be connected to or plugged into a second high-voltage plug connection part, respectively, which is formed as the built-in plug connection part. The built-in plug connection part can be integrated, for example, in a wall of a housing of the high-voltage component, for example of the electric drive motor. The second high-voltage plug connection part in the form of the built-in plug connection part is thus formed as a component connection or aggregate connection, respectively, into which the cable end plug connection part can be plugged. The at least one temperature sensor can thereby be integrated in the first high-voltage plug connection part, thus in the cable end plug connection part, or in the second high-voltage plug connection part, thus in the built-in plug connection part. The integration of the temperature sensor in the built-in plug connection part, which is integrated in the high-voltage component, results in the advantage that, for example, an integrated control device of the high-voltage component can also be used for analyzing the sensor signal detected by the temperature sensor. The analysis of the sensor signal can thus take place particularly easily in a component-internal manner.

The high-voltage plug connection part preferably has at least one external housing, in which the at least one electrical contact element of the high-voltage plug connection part and the at least one temperature sensor are arranged. In the case of the high-voltage connector, these contact elements are, for example, electrically conductive pins. In the case of the high-voltage socket, these contact elements are, for example, electrically conductive contact surfaces, on which the electrically conductive pins are arranged in the plugged-together state of the high-voltage plug connection parts. The contact elements can be made, for example, of copper. The at least one temperature sensor is thereby arranged in the respective external housing and is thus positioned particularly close to the electrical contact elements, at which a particularly large heat development can take place and at which the hotspots can appear. At least one insulation element, which encases the contact element and which is made of an electrically insulating material, for example, plastic, and which forms for example a protection against contact, can additionally be arranged in the external housing. The temperature sensor can be arranged between the insulation element and the electrical contact element.

The at least one temperature sensor is in particular arranged at the at least one electrical contact element of the high-voltage plug connection part. The temperature sensor, for example, the NTC resistor, is thus thermally coupled to the electrical contact element. The temperature sensor can be arranged, for example, so as to abut directly on the thermal contact element, for example, on one of the contact surfaces of the high-voltage socket or on one of the contact pins of the high-voltage connector. It may also be the case, however, that the temperature sensor is fastened to the electrical contact element by a thermally conductive adhesive or a thermally conductive casting compound.

In a further development of the invention, the at least one temperature sensor is electrically coupled via a connection line to a connection element, at which the sensor signal of the at least one temperature sensor can be tapped. According to this embodiment, the sensor signal detected by the temperature sensor is transmitted to the analysis device in a wired manner. For this purpose, the connection line to the connection element is installed inside the external housing. The connection element can thereby be integrated in a housing wall of the external housing surrounding the at least one contact element and the at least one temperature sensor. The connection element can be, for example, an end of the "flying" connection line. It may also be the case, however, that the connection element is formed as a plug connection part.

The invention additionally relates to a high-voltage electrical system for a motor vehicle including a high-voltage plug connector having at least one high-voltage plug connection part according to the invention or an advantageous embodiment thereof, including at least one high-voltage component and at least one high-voltage line. The at least one high-voltage component and the at least one high-voltage line are electrically connected via the high-voltage plug connector having the at least one high-voltage plug connection part. The analysis device for analyzing the sensor signal is integrated in particular in the high-voltage component. The at least one high-voltage component is in particular an electric drive motor, which is electrically connected to a traction battery of the motor vehicle via the high-voltage plug connector and the high-voltage line. The electric drive motor includes in particular an integrated inverter, which can additionally perform the analysis of the sensor signal detected by the at least one temperature sensor.

A motor vehicle according to the invention includes a high-voltage electrical system according to the invention. The motor vehicle is formed in particular as an electric vehicle or hybrid vehicle.

The embodiments introduced with reference to the high-voltage plug connection part according to the invention and the advantages thereof apply analogously for the high-voltage electrical system according to the invention and for the motor vehicle according to the invention.

Further features of the invention follow from the claims, the figures, and the figure description. The features and feature combinations mentioned above in the description, and the features and feature combinations, which will be mentioned below in the figure description and/or which will be shown in the figures alone, cannot only be used in the respective specified combination, but also in other combinations or alone.

The invention will now be described in more detail on the basis of a preferred exemplary embodiment and with reference to the drawings.

Other objects, advantages and novel features of the present invention will become apparent from the following detailed description of one or more preferred embodiments when considered in conjunction with the accompanying drawings.

BRIEF DESCRIPTION OF THE DRAWINGS

Identical and functionally identical elements are provided with the same reference numerals in the figures.

DETAILED DESCRIPTION OF THE DRAWINGS

Figure 1:
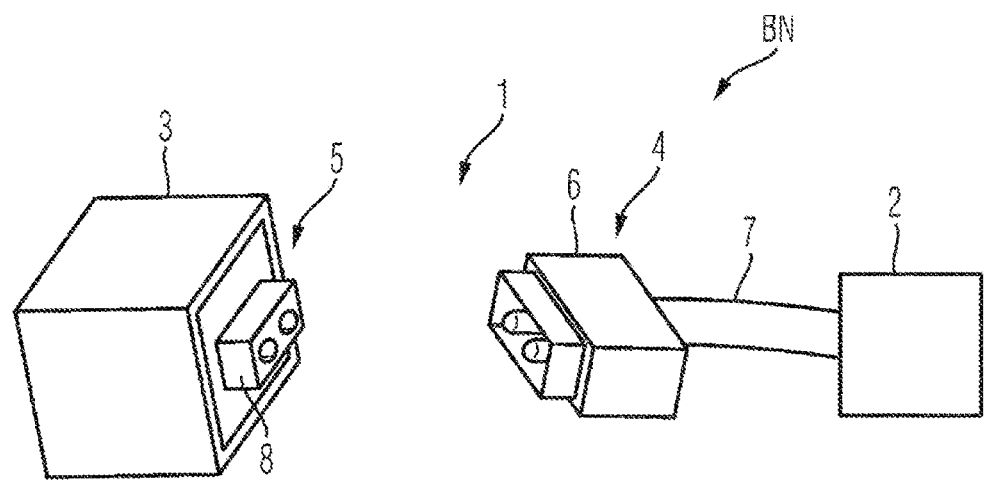
FIG. 1 shows a schematic illustration of a high-voltage electrical system of a motor vehicle.

FIG. 1 shows a high-voltage electrical system BN of a motor vehicle including a high-voltage plug connector 1 according to an embodiment of the present invention. The high-voltage plug connector 1 is designed to couple high-voltage components 2, 3 of the high-voltage electrical system BN of the motor vehicle to one another. High-voltage components 2, 3 of this type can be, for example, an electric drive motor 3 including integrated power electronics and a high-voltage battery 2 of the motor vehicle. The high-voltage plug connector 1 has two high-voltage plug connection parts 4, 5, which can be positively plugged together to form a plug connection. The first high-voltage plug connection part 4 is formed as a cable end plug connection part 6 as a high-voltage connector, for example, and is attached to one end of a high-voltage line 7. At the other end, the high-voltage line 7 is connected, for example, to the high-voltage battery 2. The second high-voltage plug connection part 5 is formed as a built-in plug connection part 8 as a high-voltage socket, for example, and is integrated or installed in the electric drive motor 3, respectively. The second high-voltage plug connection part 5 thus forms a component connection or aggregate connection, respectively. Electrical current can be transmitted from the high-voltage battery 2 to the drive motor 3 in the plugged-together state of the high-voltage plug connection parts 4, 5.

Figure 2:
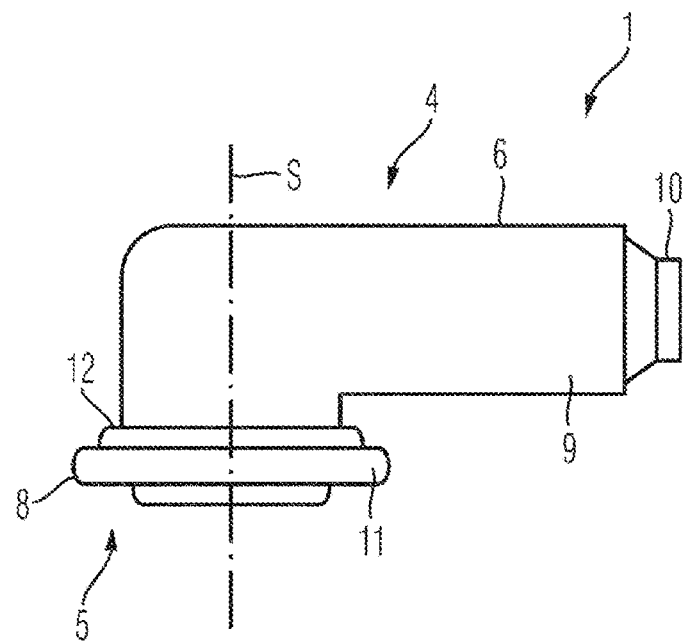
FIG. 2 shows a schematic illustration of an embodiment of a high-voltage plug connector according to the invention.

FIG. 2 shows an embodiment of the high-voltage plug connector 1 in the plugged-together state. Here, the cable end plug connection part 6 has an external housing 9 comprising an angled shape. The cable end plug connection part 6 can be coupled to the high-voltage line 7 or can be connected to the high-voltage line 7, respectively, via a connection 10. A sealing element 12, such as an O-ring, is arranged here between the external housing 9 of the cable end plug connection part 6 and an external housing 11 of the built-in plug connection part 8.

Figure 3:
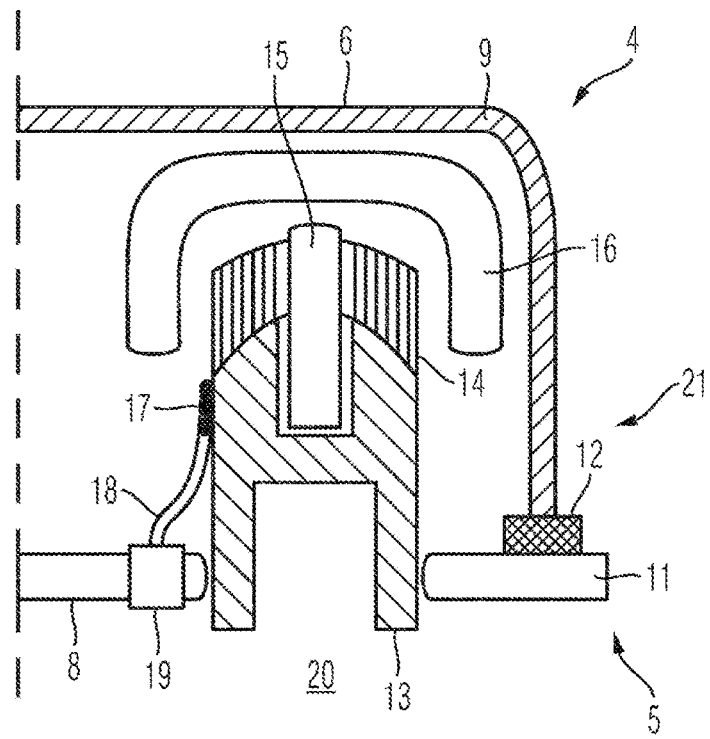
FIG. 3 shows a schematic sectional illustration of the high-voltage plug connector comprising a temperature sensor at a first position.
Figure 4:
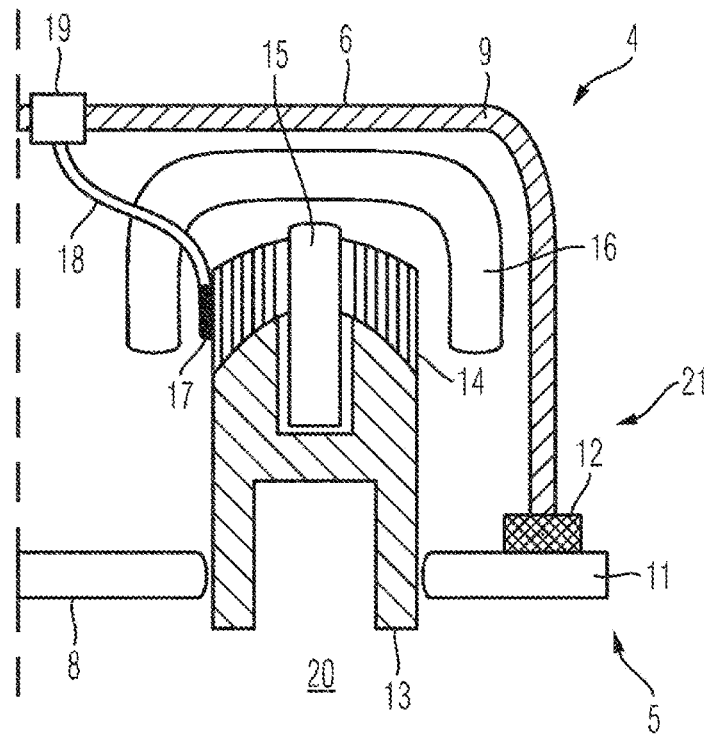
FIG. 4 shows a schematic sectional illustration of the high-voltage plug connector comprising a temperature sensor at a second position.

FIG. 3 and FIG. 4 show illustrations of a cross section through the high-voltage plug connector 1 along a sectional line S. A contact surface of an electrical contact element 13 of the built-in plug connection part 8 is electrically connected to an electrical contact element 14 of the cable end plug connection part 6, for example, a contact pin of the high-voltage connector. The electrical contact elements 13, 14 of the high-voltage plug connection parts 4, 5 can additionally be fixed in their position, in which they contact one another, via a fastening element 15. The electrical connection between the high-voltage components 2, 3 can thus be maintained reliably via the high-voltage plug connector 1. The high-voltage plug connector 1 can additionally have an insulation element 16, for example, a contact protection cap, for the electrical contact element 13 of the built-in plug connection part 8.

The high-voltage plug connection part 1 furthermore has at least one integrated temperature sensor 17, by which a heating of the high-voltage line 7 can be monitored. The heating is thereby caused by the current, which is transported via the high-voltage line 7 in the coupled state of the high-voltage plug connection parts 4, 5. For this purpose, the temperature sensor 17 is designed to detect a sensor signal, which is a function of the temperature of the high-voltage line 7 connected to the cable end plug connection part 6. The temperature sensor 17 can be formed, for example, as an NTC resistor. The temperature sensor 17 is connected via a connection line 18 to a connection element 19, at which the sensor signal, which is detected by the temperature sensor 17, can be tapped for an analysis device of the high-voltage electrical system BN. The analysis device is designed to determine a temperature of the high-voltage line 7 based on the sensor signal. When the temperature exceeds, for example, a predetermined temperature threshold value and the high-voltage line 7 is thus about to overheat, the analysis device can reduce, for example, a power transported via the high-voltage line 7 in order to protect the line.

According to FIG. 3, the temperature sensor 17 is integrated in the second high-voltage plug connection part 5 in the form of the built-in plug connection part 8, thus in the aggregate connection. The temperature sensor 17 is thereby arranged in the external housing 11 of the built-in plug connection part 8 so as to abut on the contact element 13. The connection element 19, which can be, for example, an end of the connection line 18, faces a component interior 20 of the high-voltage component 3, in which the built-in plug connection part 8 is integrated. The connection element 19, which can be integrated, for example, in the external housing 11 of the built-in plug connection part 8, can be coupled, for example, to the analysis device of the high-voltage component 3. In the case of a high-voltage component 3 in the form of an electric drive motor comprising integrated power electronics, the analysis device can be integrated, for example, in an inverter of the drive motor.

According to FIG. 4, the temperature sensor 17 is integrated in the first high-voltage plug connection part 4 in the form of the cable end plug connection part 6. Here, the temperature sensor 17 is thereby arranged in the external housing 9 of the cable end plug connection part 6 between the contact element 14 and the contact protection cap 16 and so as to abut on the contact element 14. Here, the connection line 18 is guided through the cable end plug connection part 6 to the connection element 19, which is integrated in the external housing 9 of the cable end plug connection part 6.

It can also be provided that the connection line 18 according to the embodiments of FIG. 3 and FIG. 4 is guided to a connection region 21 between the external housing 9 of the cable end plug connection part 6 and the external housing 11 of the built-in plug connection part 8, in which in particular the sealing element 12 is located. The connection element 19 can be arranged in this connection region 21 for tapping the sensor signal.

REFERENCE LIST 1 high-voltage plug connector
2 first high-voltage component
3 second high-voltage component
4 first high-voltage plug connection part
5 second high-voltage plug connection part
6 cable end plug connection part
7 high-voltage line
8 built-in plug connection part
9 external housing of the cable end plug connection part
10 connection
11 external housing of the built-in plug connection part
12 sealing element
13 contact element of the built-in plug connection part
14 contact element of the cable end plug connection part
15 fastening element
16 insulation element
17 temperature sensor
18 connection line
19 connection element
20 component interior
21 connection region
S sectional line
BN high-voltage electrical system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A high-voltage plug connection part for a high-voltage plug connector, which can be coupled to at least one high-voltage line, of a high-voltage electrical system of a motor vehicle, wherein the high-voltage plug connection part has at least one integrated temperature sensor, which is designed to detect a sensor signal that characterizes a temperature of the at least one high-voltage line, and to provide the detected sensor signal to an analysis device in order to monitor the temperature of the at least one high-voltage line, wherein the at least one integrated temperature sensor is arranged so as to abut on at least one contact element of the high-voltage plug connection part,
wherein the analysis device is integrated in at least one high-voltage component for analyzing the detected sensor signal.

2. The high-voltage plug connection part according claim 1, wherein the high-voltage plug connection part has at least one external housing, in which the at least one electrical contact element of the high-voltage plug connection part and the temperature sensor are arranged.

3. The high-voltage plug connection part according to claim 1, wherein the at least one temperature sensor is electrically coupled via a connection line to a connection element, at which the sensor signal of the at least one temperature sensor can be tapped by the analysis device.

4. The high-voltage plug connection part according to claim 1, wherein the at least one temperature sensor is formed as an NTC resistor.

5. The high-voltage plug connection part according to claim 4, wherein the high-voltage plug connection part is formed as a built-in plug connection part for integrating in an electric drive motor of the high-voltage electrical system of the motor vehicle.

6. The high-voltage plug connection part according to claim 4, wherein the high-voltage plug connection part is formed as a cable end plug connection part for connecting to the high-voltage line of the high-voltage electrical system of the motor vehicle.

7. The high-voltage plug connection part according claim 4, wherein the high-voltage plug connection part has at least one external housing, in which the at least one electrical contact element of the high-voltage plug connection part and the temperature sensor are arranged.

8. The high-voltage plug connection part according to claim 4, wherein the at least one temperature sensor is electrically coupled via a connection line to a connection element, at which the sensor signal of the at least one temperature sensor can be tapped by the analysis device.

9. The high-voltage plug connection part according to claim 1, wherein the high-voltage plug connection part is formed as a built-in plug connection part for integrating in an electric drive motor of the high-voltage electrical system of the motor vehicle.

10. The high-voltage plug connection part according to claim 9, wherein the high-voltage plug connection part is formed as a cable end plug connection part for connecting to the high-voltage line of the high-voltage electrical system of the motor vehicle.

11. The high-voltage plug connection part according claim 9, wherein the high-voltage plug connection part has at least one external housing, in which the at least one electrical contact element of the high-voltage plug connection part and the temperature sensor are arranged.

12. The high-voltage plug connection part according to claim 9, wherein the at least one temperature sensor is electrically coupled via a connection line to a connection element, at which the sensor signal of the at least one temperature sensor can be tapped by the analysis device.

13. The high-voltage plug connection part according to claim 1, wherein the high-voltage plug connection part is formed as a cable end plug connection part for connecting to the high-voltage line of the high-voltage electrical system of the motor vehicle.

14. The high-voltage plug connection part according claim 13, wherein the high-voltage plug connection part has at least one external housing, in which the at least one electrical contact element of the high-voltage plug connection part and the temperature sensor are arranged.

15. The high-voltage plug connection part according to claim 13, wherein the at least one temperature sensor is electrically coupled via a connection line to a connection element, at which the sensor signal of the at least one temperature sensor can be tapped by the analysis device.

16. A high-voltage electrical system for a motor vehicle including a high-voltage plug connector having at least one high-voltage plug connection part for the high-voltage plug connector, which can be coupled to at least one high-voltage line, of the high-voltage electrical system of the motor vehicle, wherein the high-voltage plug connection part has at least one integrated temperature sensor, which is designed to detect a sensor signal that characterizes a temperature of the at least one high-voltage line, and to provide the detected sensor signal to an analysis device in order to monitor the temperature of the at least one high-voltage line, the high-voltage electrical system comprising:
- at least one high-voltage component and the at least one high-voltage line, wherein the at least one high-voltage component and the at least one high-voltage line are electrically connected via the high-voltage plug connector having the at least one high-voltage plug connection part,
- wherein the at least one integrated temperature sensor is arranged so as to abut on at least one contact element of the high-voltage plug connection part, and
- wherein the analysis device is integrated in the at least one high-voltage component for analyzing the detected sensor signal.

17. A motor vehicle comprising a high-voltage electrical system including a high-voltage plug connector having at least one high-voltage plug connection part for the high-voltage plug connector, which can be coupled to at least one high-voltage line, of the high-voltage electrical system of the motor vehicle, wherein the high-voltage plug connection part has at least one integrated temperature sensor, which is designed to detect a sensor signal that characterizes a temperature of the at least one high-voltage line, and to provide the detected sensor signal to an analysis device in order to monitor the temperature of the at least one high-voltage line, the high-voltage electrical system including at least one high-voltage component and the at least one high-voltage line, wherein the at least one high-voltage component and the at least one high-voltage line are electrically connected via the high-voltage plug connector having the at least one high-voltage plug connection part, and wherein the at least one integrated temperature sensor is arranged so as to abut on at least one contact element of the high-voltage plug connection part,
- wherein the analysis device is integrated in the at least one high-voltage component for analyzing the detected sensor signal.

* * * * *